US011932496B2

(12) United States Patent
Sjerps et al.

(10) Patent No.: US 11,932,496 B2
(45) Date of Patent: Mar. 19, 2024

(54) METHOD OF OPERATING AN ALIGNMENT STATION FOR SLICES, AND AN ALIGNMENT STATION FOR PERFORMING SAID METHOD

(71) Applicant: Automotion Systems Venhuizen B.V., Andijk (NL)

(72) Inventors: Antonius Ambrosius Jozef Sjerps, Andijk (NL); Richard Cornelis Theodoris Wagenaar, Enkhuizen (NL)

(73) Assignee: Automotion Systems Venhuizen B.V., Andijk (NL)

( * ) Notice: Subject to any disclaimer, the term of this patent is extended or adjusted under 35 U.S.C. 154(b) by 234 days.

(21) Appl. No.: 17/304,477

(22) PCT Filed: Dec. 19, 2019

(86) PCT No.: PCT/NL2019/050857
§ 371 (c)(1),
(2) Date: Jun. 22, 2021

(87) PCT Pub. No.: WO2020/130823
PCT Pub. Date: Jun. 25, 2020

(65) Prior Publication Data
US 2023/0166922 A1    Jun. 1, 2023

(30) Foreign Application Priority Data
Dec. 21, 2018  (NL) ..................................... 2022278

(51) Int. Cl.
*B65G 47/24*    (2006.01)
*B65G 47/244*   (2006.01)

(52) U.S. Cl.
CPC .. *B65G 47/2445* (2013.01); *B65G 2201/0202* (2013.01)

(58) Field of Classification Search
CPC ................... B65G 47/2445; B65G 2201/0202
(Continued)

(56) References Cited

U.S. PATENT DOCUMENTS 3,643,587 A * 2/1972 Harrington ............ A23C 19/14
                                                        99/477
5,508,818 A * 4/1996 Hamma .................... B07C 1/02
                                                        358/401
(Continued)

FOREIGN PATENT DOCUMENTS

EP    1180484 A2    2/2002
EP    1180484    *  8/2002    ............. B65G 47/22
(Continued)

OTHER PUBLICATIONS

International Search Report dated Mar. 24, 2020 issued in connection with International Application No. PCT/NL2019/050857 (3 pages total).
(Continued)

*Primary Examiner* — Lynn E Schwenning
(74) *Attorney, Agent, or Firm* — Tatonetti IP (57) ABSTRACT

An alignment station and a method of operating the alignment station allows for rotation of slices such as slices of meat or cheese. The alignment station comprises a conveyor which comprises a plurality of closed loop elements, a first roll unit and a second roll unit. The slice is supported on a first loop section of the plurality of closed loop elements. To reduce problems that may occur during rotation of the slice, said slice is subjected to vibration in the first loop section.

12 Claims, 5 Drawing Sheets

(58) Field of Classification Search
USPC .................................. 198/766, 609, 752.1
See application file for complete search history.

(56) References Cited

U.S. PATENT DOCUMENTS

| | | | | |
|---|---|---|---|---|
| 5,641,055 | A * | 6/1997 | Anderson | B65G 69/04 |
| | | | | 198/631.1 |
| 6,708,815 | B2 * | 3/2004 | Kato | B65G 25/04 |
| | | | | 198/750.8 |
| 8,636,137 | B2 | 1/2014 | Weber | |
| 8,657,103 | B2 * | 2/2014 | Herrmann | B65G 47/24 |
| | | | | 198/759 |
| 2007/0034417 | A1 * | 2/2007 | Moulsdale | G01G 13/08 |
| | | | | 177/16 |
| 2010/0256810 | A1 | 10/2010 | Weber | |

FOREIGN PATENT DOCUMENTS

| | | | | |
|---|---|---|---|---|
| JP | 200923806 | * | 2/2009 | ............. B65G 47/28 |
| JP | 2009023806 A | | 2/2009 | |

OTHER PUBLICATIONS

Written Opinion of the International Searching Authority dated Mar. 24 2020 issued in connection with International Application No. PCT/NL2019/050857 (5 pages total).

\* cited by examiner

METHOD OF OPERATING AN ALIGNMENT STATION FOR SLICES, AND AN ALIGNMENT STATION FOR PERFORMING SAID METHOD

CROSS-REFERENCE TO RELATED APPLICATIONS

This Non-Provisional Utility Patent Application claims the benefit of and priority to PCT Application Serial No. PCT/NL2019/050857, filed Dec. 19, 2019, entitled "A METHOD OF OPERATING AN ALIGNMENT STATION FOR SLICES, AND AN ALIGNMENT STATION FOR PERFORMING SAID METHOD," which claims the benefit of and priority to Netherlands Application Serial No. 2022278, filed Dec. 21, 2018, entitled "A METHOD OF OPERATING AN ALIGNMENT STATION FOR SLICES, AND AN ALIGNMENT STATION FOR PERFORMING SAID METHOD," the entire contents of both applications is hereby incorporated herein by reference.

BACKGROUND

U.S. Pat. No. 8,636,137 relates to a method and a device for the alignment of food products in which food products arriving on an input conveyor in the supply direction arrive at an alignment station at which the products are aligned and from which the aligned products arrive at an output conveyor. The misalignment of the products relative to a target alignment is detected, and the product support is actuated in order to perform the alignment movement, and wherein the alignment of the products is accomplished without relative movements between the products and the product support.

EP1180484 discloses a fine alignment station comprising two neighboring conveyor belts moving at different speeds to turn the goods they carry, and an optical position sensor. The sensor is an image processing system, which repeatedly determines the position of the goods to be packed and uses this data for repeated regulation of the drive for the conveyor belts.

JP2009023806 discloses a method of rotating in a single orientation only for hard objects, in having particular ellipse ball shape. The orientation of the single orientation is with the longitudinal axis of the objects parallel to the direction of transport. Use is made of vibration, wherein incorrectly oriented objects rest on vibrating side belts whereas correctly oriented objects rest on a relatively lower central belt.

SUMMARY

The present invention relates to a method of operating an alignment station for slices, said slices being chosen from slices of cheese, meat or fish, said alignment station comprising
a conveyor, said conveyor comprising a plurality of closed loop elements, a first roll unit and a second roll unit, wherein
the first roll unit comprises a first nose roll assembly, said first nose roll assembly
comprising a plurality of first nose rolls, and
defining an upstream end of the conveyor; and
the second roll unit comprises a second nose roll assembly, said second nose roll assembly
comprising a plurality of second nose rolls, and
defining a downstream end of the conveyor;
the plurality of closed loop elements is capable of running over the first nose roll assembly to the second roll unit assembly; said plurality of closed loop elements comprising
a first loop section of the plurality of closed loop elements extending from the first nose roll assembly to the second nose roll assembly, wherein said first loop section defines a slice support surface, and
a second loop section of the plurality of closed loop elements extending from the second roll unit back to the first nose roll assembly;
a control unit comprising
a control module for correcting the orientation of the slice on the slice support surface by varying the relative speed of closed loop elements of the plurality of closed loop elements;
wherein the method comprises the steps of
determining the orientation of a slice, and
correcting the orientation of said slice while on the slice support surface by varying the relative speed of closed loop elements using the control module.

A method according to the preamble is known in the art. It is used for orienting slices, such as fish or slices of cheese or meat, that are to be packaged. Re-orientation is achieved by having the control unit control means for driving the closed loop elements, the means typically comprising motors that can be run at various speeds independent of each other The number of slices that is produced on a daily basis is large, requiring a large number of slices to be processed per minute. Re-orienting slices is a bottleneck. The shape of a product, in particular if it is an oblong product, can make a product hard to rotate, and the rotation may even stall. In addition, the type of product may give rise to difficulties. Weak slices, like a slice of cheese or meat, are may be susceptible to deformation or folding, which is undesirable. In case of the slice being part of a stack of partially overlapping slices, similar problems can be experienced or the slice is hard to rotate. In such cases, where typically tens of slices or more have to be oriented per minute, a failure to orient properly can interrupt the packaging process and requires an operator to solve the issue.

It is an object of the present invention that allows for a more reliable re-orientation of slices, and more specifically to allow the reliable re-orientation to any desired orientation, such as desired with the slide longside forward-facing or shortside forward-facing.

To this end, a method according to the preamble is characterized in that the slice is subjected to vibration in the first loop section.

Thus a method is provided using an alignment station capable of performing re-orientation of an article (slice) effectively and this re-orientation can be achieved within a relatively short distance (travel length; the length of the first loop section. A typical length will be 500-700 mm) even for a rotation over a large angle such as 90°. The orientation can be any orientation, such as longside leading or shortside leading in case of rectangular or oval products.

Vibration is preferably done during re-orientation (correction of the orientation) and typically the vibration is continuous (non-stop).

This helps to rotate the slice more reliably and/or more accurate and/or faster, especially if the slice has a tendency to stick to the closed loop elements, or happen to have not enough grip for example because of local differences in friction between the slice and the support surface.

The frequency of vibration is in general at least 1 Hz, preferably at least 3 Hz. The frequency is in general at most 100 Hz. The frequency is preferably in the range of 4 to 30 Hz, and more preferably 5 to 20 Hz.

The vibration may be effected by vibrating at least one of the closed loop elements in the first loop section. The vibration is preferably vibration transverse to the slice support surface, as this helps to avoid tension on the slice which may cause damage (e.g. in case of slices of meat which can be very susceptible to tearing). The amplitude is typically at least 1 mm, preferably at least 2 mm and more preferably at least 3 mm and is for example between 5 mm and 10 mm. Vertical vibration may for example be achieved using a non-round axle. In the context of the present invention, non-round means with respect to the axis of rotation of the axle. The axle is for example an axle having a polygonal cross-section. This axle may be an axle of the first or second nose roll assembly, with both being also a possibility. The axle may have two or more different non-round axle sections for contact with the closed loop elements, as a result of which the phase and/or frequency and/or amplitude can differ per closed loop element. The alignment station may in addition or alternatively also comprise a dedicated device just for effecting the vibration, such an actuator-driven non-round axle. A dedicated device may, for example, also be a pneumatic or magnetic device.

Vibrating with a difference in phase may for example be achieved using an axle comprising a multitude of axle sections having polygonal cross-sections, wherein the corner edges of two axle sections are not in line with each other, for example by fixedly mounting the axle sections rotated relative to each other.

Vibration with different frequency can be achieved using different non-round axles or (in case of a dedicated device only) axle sections rotated at different speed. Or a single axle may be used with at least two axle sections having a different polygonal sections, for example one having a heptagonal and another having an octagonal cross-section.

Typically the closed loop elements will be strings (cords; typically with a cross-sectional diameter of 3 to 6 mm) or bands (belts). Typically the closed loop elements will be of resilient material, such as an elastomer. In the method according to the present invention the slice will be supported in the first loop section by at least three, preferably at least 5 and more preferably at least 8 closed loop elements. In case of cords the number will be at least 6, preferably at least 10 and more preferably at least 16.

It is preferred that at least three sets of closed loop elements, preferably at least 4 sets and more preferably at least 5 sets of closed loop elements are present, wherein each set comprises at least two closed loop elements, wherein the closed loop elements of a given set are operated at the same speed as the other closed loop elements of said set. Thus fewer motors are required to drive the closed loop elements.

In the method according to the present invention, a combination of at least one—but typically a multitude of—individually driven closed loop element and at least one set of closed loop elements is possible. The slice support surface is a planar surface.

The roll units will keep the closed loop elements spaced apart (i.e. overlap is avoided). In its most basic form, a nose roll assembly of a roll unit comprises an axle, said nose roll assembly comprising a plurality of grooves for the closed loop elements. Preferably however the roll unit will comprise at least two nose rolls and the nose rolls will rotate driven by the closed loop element or elements running over it. All closed loop elements running over a particular nose roll will be driven with the same speed.

Typically, in the method according to the present invention the slice will be supplied using a supply conveyor (upstream of the alignment station), and the orientation of the slice may be determined while the slice is on the supply conveyor and/or on the alignment station, preferably both.

The method according to the invention will typically be part of a method of packaging slices, and thus comprises the step of packaging the slice after it leaves the second roll unit.

Typically the alignment station will comprise a frame and in general the driven axles for driving the closed loop elements will be mounted lower than the slice support surface to the frame.

The control unit will typically comprise a module for optically determining the orientation of the slice and determining any deviation from the desired orientation. The module for optically determining the orientation of the slice will typically comprise a camera and the slice will be moved through its field of view. The optical module is capable of determining the orientation of the slice on at least one of the supply conveyor and/or on the alignment station, preferably both.

According to a favourable embodiment, at least two of the closed loop elements are vibrated in the first loop section while said two closed loop elements run at a different speed.

This helps to rotate the slice quicker and/or more reliably and/or more accurate.

According to a favourable embodiment, at least two of the at least two of the closed loop elements are vibrated with at least one of i) a different frequency, ii) a different amplitude and iii) a different phase.

A difference in phase and/or amplitude when vibrating at the same frequency—or a different amplitude and/or vibrating at a different frequency—helps to rotate the slice quicker and/or more reliably and/or more accurate even more.

Vibrating with a difference in phase may for example be achieved using an axle comprising a multitude of axle sections having polygonal cross-sections, wherein the corner edges of two axle sections are not in line with each other. Such a rotatable axle can be manufactured by rotating two axle sections rotated relative to each other and fixing them together, so they will rotate as a single axle.

Vibration with different frequency can be achieved using different non-round axles or axle sections rotated at different speed. Or a single axle may be used with at least two axle sections having a different polygonal sections, for example one having a heptagonal and another having an octagonal cross-section.

The vibration may also be irregular, which can be achieved using irregular polygonal cross-section or cross-sections.

According to a favourable embodiment, to vibrate the slice support surface, the alignment station comprises at a side of the first loop section opposite of the slice support surface at least one rotatable axle.

A rotatable axle is a reliable manner to vibrate one or more closed loop members. The number of rotatable axles is preferably at least two. This allows for vibration with desired characteristics over a longer distance of the first loop section. If the axles are different, this allows for a mix of vibration characteristics.

According to a favourable embodiment, comprising at least one axle section at an angle to the axis of rotation of the rotatable axle.

This allows different closed loop elements to vibrate with different amplitude and/or phase. It also locally change the distance between adjacent loop elements helping to overcome excessive stick of the slice to the slice support surface that could prevent proper rotation.

The rotatable axle is for example V-shaped, allowing relatively centrally located closed loop elements to hardly vibrate if at all whereas closed loop members on opposite sides of the center line of the support surface vibrate with a larger amplitude and with the same phase. In another embodiment the axle is a straight axle mounted in a plane also comprising the axis of rotation of the axle, with the axle preferably mounted eccentrically such that a the closed loop elements opposite of centrally located closed loop element vibrate with an opposite phase.

According to a favourable embodiment, the axis of rotation of the rotatable axle is parallel to a reference plane defined by axes of rotation of the first nose roll assembly and the second nose roll assembly.

This has been found to work well, in particular if the amplitude of centrally located closed loop elements is less than that of closed loop elements located away from the center line of the support surface. This helps to reduce sideway-shift of the slice while vibrating the first loop section.

It is preferred that the axis of rotation of the rotatable axle is parallel with the axis of rotation of first nose roll assembly.

According to a favourable embodiment, the first nose roll assembly and the second nose roll assembly are passive and the closed loop elements are driven in the second loop section by at least two driven axles under control of the control module.

This allows for the method to be performed using a compact alignment station. In the present invention, the term passive nose roll assembly means that the closed loop elements are not driven by the nose roll assembly.

The driven axles will typically be driven using electrical motors.

According to a favourable embodiment, the first roll unit and a supply conveyor are laterally movable relative to one another, wherein the method comprises
- a step of supplying the slice to be oriented using a supply conveyor,
- a step of determining the location of the slice on the supply conveyor, and
- a step of relatively moving the first roll unit and the supply conveyor to allow the slice to be delivered closer to the center line of the support surface of the alignment station at the first roll unit.

This allows for rotation of a slice in case of a limited number of closed loop elements or a limited number of sets thereof. It may also facilitate correct delivery of the rotated slice downstream of the alignment station.

The term laterally movable means movable in a direction parallel to the axis of rotation of the first nose roll assembly while keeping the gap distance between the first nose roll assembly and the first conveyor substantially constant.

The term closer means that the center of the slice is closer to the center line of the support surface than if there had been no relative movement.

The relative movement covers three possibilities: i) movement of the supply conveyor, ii) movement of the first roll unit and iii) movement of both. It is preferred that the first roll unit of the alignment station is laterally movable. Thus the method can be performed over a relatively short distance, which makes it easier to implement the method in existing buildings and/or to integrate it in existing production lines.

The location is typically determined optically. Typically an alignment station comprises a module for optically determining the orientation of the slice to be rotated. It is preferred that the same module is used to determine the location of the slice to be delivered closer to the center line of the support surface.

According to a favourable embodiment, the second roll unit and a downstream conveyor are laterally movable relative to one another, wherein the method comprises,
- a step of determining the location of the slice subjected to rotation while on the support surface, and
- a step of moving the second roll unit of the alignment station and the downstream further conveyor laterally relative to one another to allow the slice to be delivered at a downstream further conveyor comprising a further support surface closer to the center line of said further support surface of said downstream further conveyor.

This allows for improved delivery of the rotated slice at the center line of the downstream further conveyor for a further operation, such as packaging.

The relative lateral movement is advantageous as a slice may not necessarily rotate about its center, due to local differences in friction between the support and the slice. For example in case of cheese with holes, the presence or absence of a hole may have an effect.

The location of the slice on the support surface is typically determined optically. Typically, the orientation of the slice is determined using a module for optically determining the orientation of the slice subjected to rotation on the support surface, and it is preferred that the same module is used for determining the location of the slice with respect to the center line, thus saving cost.

The relative movement covers three possibilities: i) movement of the downstream further conveyor, ii) movement of the second roll unit and iii) the movement of both. It is preferred that the second roll unit is laterally movable, thus keeping the gap distance to the downstream conveyor substantially constant. Thus the method can be performed over a relatively short distance, which makes it easier to implement the method in existing buildings and/or to integrate it in existing production lines. This is in particular true if both the first roll unit and the second roll unit are laterally movable, independent of each other.

Finally, the present invention relates to an alignment station for slices, said slices chosen from slices of cheese, said station comprising
- a conveyor, said conveyor comprising a plurality of closed loop elements, a first roll unit and a second roll unit, wherein
- the first roll unit comprises a first nose roll assembly, said first nose roll assembly
- comprising a plurality of first nose rolls, and
- defining an upstream end of the conveyor; and
- the second roll unit comprises a second nose roll assembly, said second nose roll assembly
- comprising a plurality of second nose rolls, and
- defining a downstream end of the conveyor;
- the plurality of closed loop elements is capable of running over the first nose roll assembly to the second roll unit assembly; said plurality of closed loop elements comprising
- a first loop section of the plurality of closed loop elements extending from the first nose roll assembly to the second nose roll assembly, wherein said first loop section defines a slice support surface, and a second loop section of the plurality of closed loop elements extending from the second roll unit back to the first nose roll assembly;

a control unit comprising a control module for correcting the orientation of the slice on the slice support surface by varying the relative speed of closed loop elements of the plurality of closed loop elements; wherein the first loop section of the alignment station comprises a device for allowing a product on the first loop section to vibrate.

Such an alignment station is suitable for use in the method according to the invention. The invention also relates to the embodiments of the alignment station as provided for by and discussed for the method claims in any combination, repetition of which has been abstained from for the sake of brevity only.

The device is preferably a dedicated device for vibrating the first loop section, which device is located away from the first and second roll units, such as at between 20% and 80% of the distance between the axes of rotation of the first and second nose roll assemblies, which facilitates vibration of the slice on the support surface. The slice support surface is a planar surface.

According to a favourable embodiment, the device is a rotatable axle that is non-round with respect to its axis of rotation.

Such a non-round axle that will be in contact with at least one closed loop element, typically at the underside of the first loop section, can be used to let one or more closed loop elements vibrate in the first loop section. The non-round axle may for example have the shape of a crankshaft of a combustion motor, which would allow for vibration of closed loop elements with the same frequency and amplitude.

According to a favourable embodiment, the device comprises at least one freely rotatable roll for contact with the closed loop elements in the first loop section.

Thus the friction with and wear of the closed loop elements is reduced. Preferably for each set of the closed loop elements there is at least one roll. If all closed loop elements are driven individually and there are no sets of two or more closed loop elements with jointly driven at the same speed, it is preferred that there is at least one roll for each closed loop element and/or for each set of closed loop elements.

BRIEF DESCRIPTION OF THE DRAWINGS

The present invention will now be illustrated with reference to the drawing where FIG. 1A and FIG. 1B respectively show a perspective view and a top view on an alignment station.

DETAILED DESCRIPTION

Figure 1A:
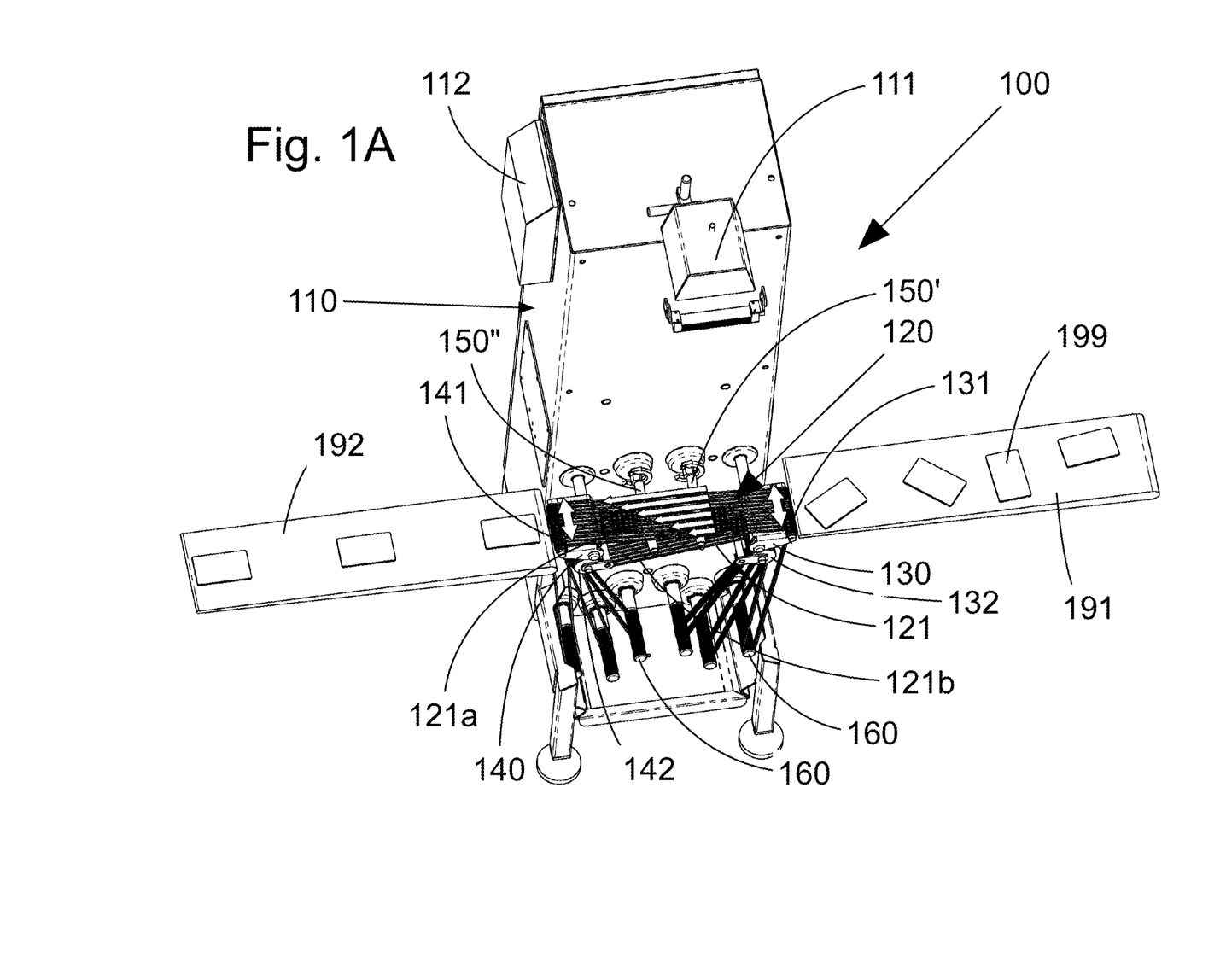
Figure 1B:
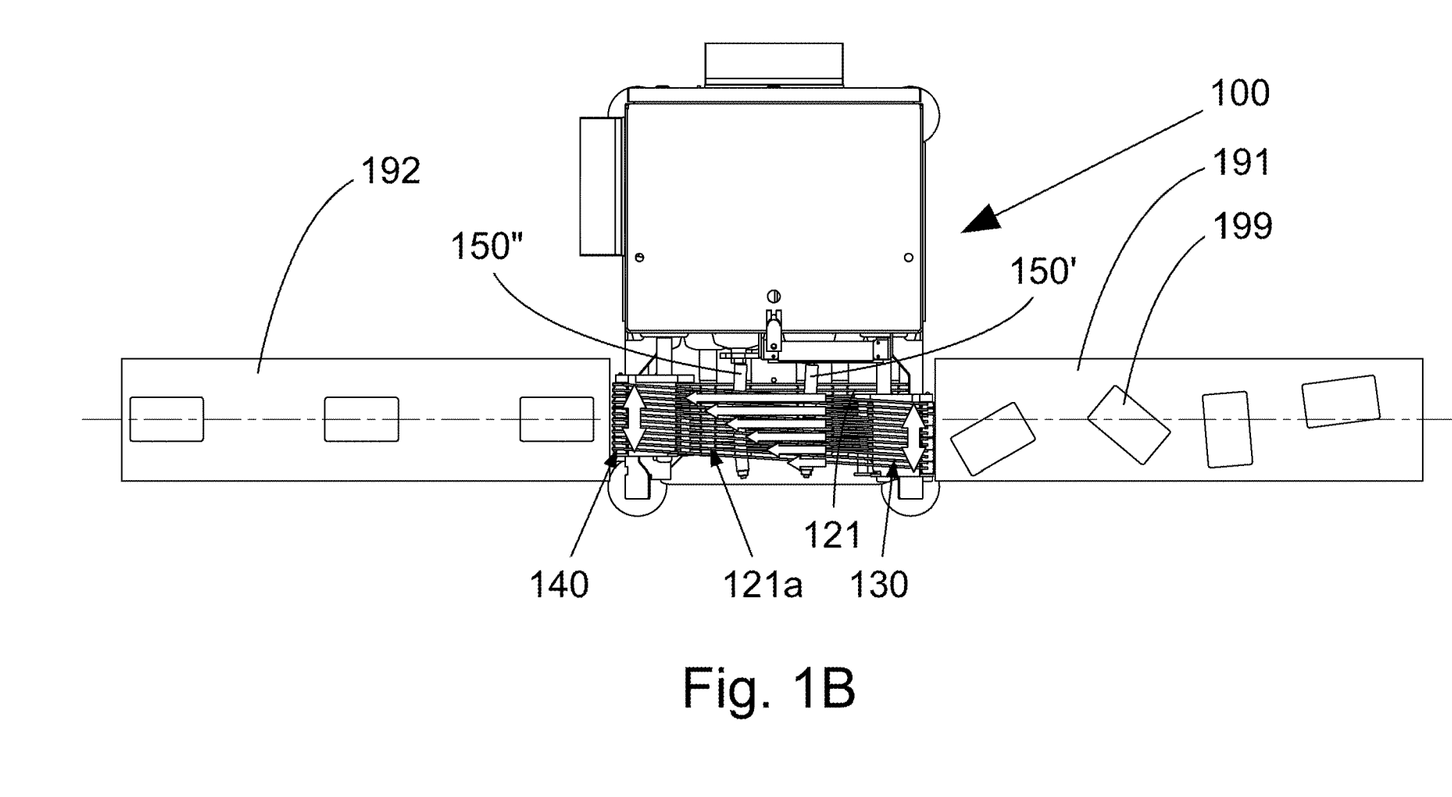

FIG. 1A and FIG. 1B respectively show a perspective view and a top view on an alignment station 100 positioned between a first conveyor belt 191 for supplying slices 199 such as slices of cheese, fish or meat to be aligned, and a second conveyor belt 192 for transporting the aligned slices to a packaging machine (not shown).

The alignment station 100 comprises a control unit 110, said control unit 110 comprising a module 111 for optically determining the orientation and position of an slices 199, said module 111 comprising a downward-facing camera with CPU (not shown), and a control module 112 for correcting the orientation of a slice 199, for example running commercially available Cognex software.

The alignment station 100 also comprises a conveyor 120 comprising a plurality of closed loop elements 121 running over a first nose roll assembly 131 and a second nose roll assembly 141. From the upstream first nose roll assembly 131 to the downstream second nose roll assembly 141 a section of the closed loop elements 121, designated first loop section 121a define a support surface for the slice 199 to be aligned using the alignment station 100.

An alignment station 100 as described above is known in the art.

In accordance with the method of the present invention, the closed loop elements 121 are vibrated in the first loop section 121a so as to help the rotational alignment of the slices. In case of slices of fish, cheese or meat it also helps to reduce the risk of deforming a slice, i.e. such that no longer lies flat on the support surface and may tear apart.

In the embodiment of the alignment station 100 according to the present invention discussed here, the first loop section 121a of the alignment station is at its underside provided with an axle 150 that is non-round with respect to its axis of rotation, and more specifically here there is a first axle 150' and a second axle 150" which will be discussed in more detail with reference to FIG. 2A and FIG. 2B.

In the embodiment of the invention discussed here, the alignment station 100 comprises a first roll unit 130 and a second roll unit 140. The first roll unit 130 and the second roll unit 140 can be moved laterally independently, keeping the gap distance between the first nose roll assembly and the first conveyor and the gap distance between second nose roll assembly and the second conveyor respectively substantially constant. The first roll unit 130 comprises the first nose roll assembly 131 and a first guide roll assembly 132. The second roll unit 140 comprises the second nose roll assembly 141 and a second guide roll assembly 142. The guide roll assemblies will be discussed in detail with reference to FIG. 3A-C.

In the embodiment discussed here, there are six sets of closed loop elements 121. Each set comprises four elastomer cords (polyurethane) as the closed loop elements, each cord having a circular cross-section with a diameter of 4 mm. Each set is independent of the other sets driven by its own axle 160. From the downstream second nose roll assembly 141 to the first nose roll assembly 131 the closed loop elements define a second loop section 121b. Half of the sets of closed loop elements run via the second guide roll assembly 142 and their axle 160 to the first nose roll assembly 131, and the other half of the sets of closed loop elements run via their driven axle 160 via the first guide roll assembly 132 to the first nose roll assembly 131.

In operation the control unit will register any misalignment in the position of a slice, which is done while the slice is on the first conveyor belt 191. If the slice 199 is expected to be delivered off-center at the location of the first roll unit 130, the first roll unit 130 may be moved to receive the slice 199 supplied by the first conveyor belt 191 in the middle of the support surface at the first nose roll assembly 131. The control module 112 will control the driven axles 160 at different speeds so as to make the sets of closed loop elements 121 run at different speeds, causing the slice 199 on the support surface to be rotated, typically while being transported on the conveyor 120. Should the module 111 determine that the rotated slice is not located for centrally delivery to the second conveyor belt 192, the second roll unit 140 may be moved to correct for that. Thus the slice will be rotated correctly and centered in one step.

To achieve this goal more reliably and/or more accurate, the closed loop elements 121 in the first loop section are vibrated using the axles 150. These axles 150 will now be discussed.

Typically the rotation of the product while on the first loop section 121a will be monitored and controlled real-time.

Figure 2A:
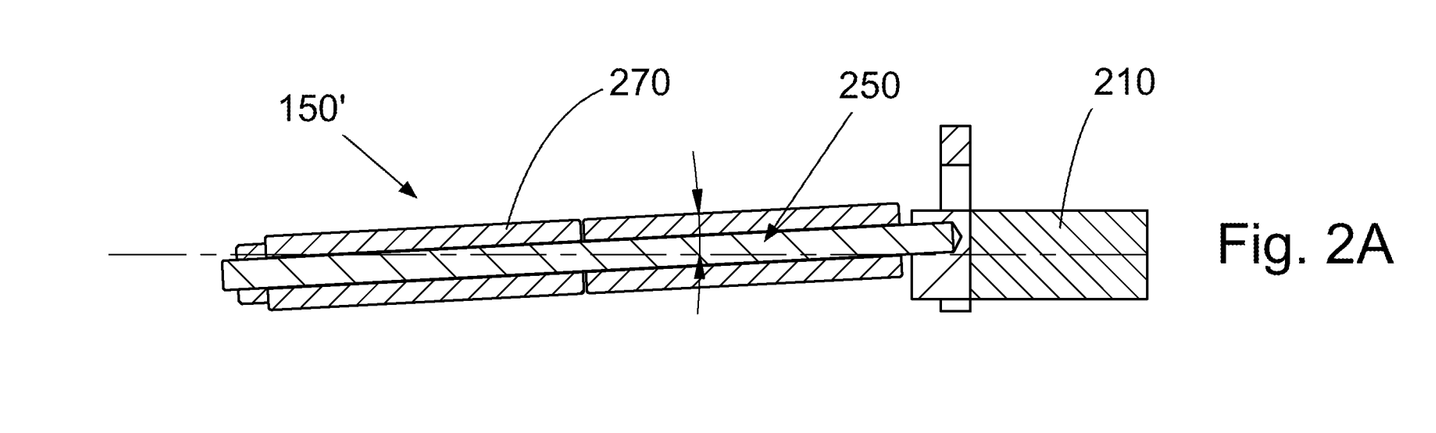
FIG. 2A and FIG. 2B depict two cross-sectional views of two non-round axles.
Figure 2B:
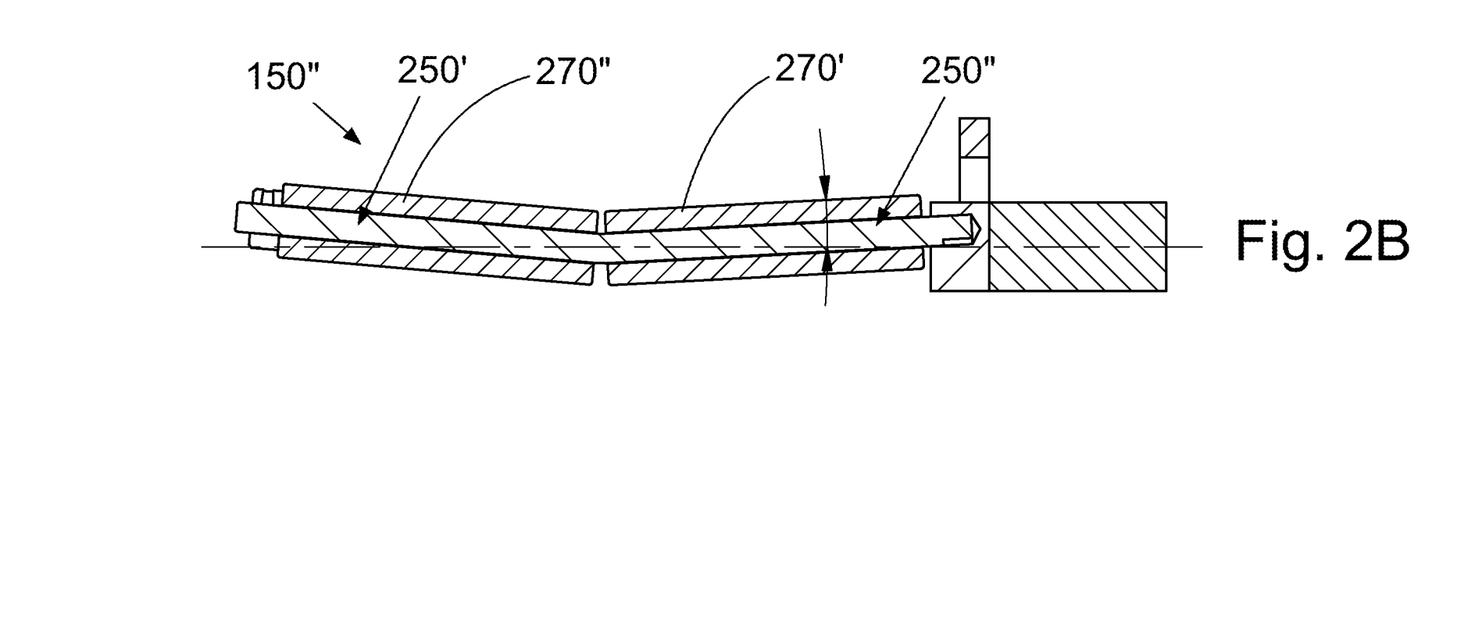

FIG. 2A and FIG. 2B depict two cross-sectional views in a longitudinal direction through two non-round axles 150, each independently driven by a motor 210. To save on a motor, it is possible to drive them with a single motor.

In the first embodiment (FIG. 2A), the axle 150 comprises a single axle section 250, which axle section 250 is provided with two freely rotatable rolls 270 with the longitudinal axis of the axle 150 at an angle to the axis of rotation of the non-round axle 150. In this embodiment, the outer closed loop elements 121 will vibrate at the same frequency as the inner closed loop elements 121, but with a larger amplitude. The left and right outermost closed loop elements 121 vibrate with an opposite phase. The rolls 270 are rotatable about the center line of the respective axle section to reduce friction with and wear of the closed loop elements running against them while the method according to the invention is performed.

The rolls 270 preferably don't have any grooves in them for the closed loop elements 121.

The number of rolls is preferably at least equal to the number of sets of cords 121.

In the second embodiment (FIG. 2B), the axle 150 comprises two axle sections (axle section 250' and axle section 250" each provided with a single freely rotatable roll (roll 270' and roll 270"), each axle section with its longitudinal axis at an angle to the axis of rotation of the non-round axle 150. In this embodiment also, the outer closed loop elements 121 will vibrate at the same frequency as the inner closed loop elements 121, but with a larger amplitude. The left and right outermost closed loop elements 121 vibrate with the same phase.

Vibrating closed loop elements at different frequencies can be obtained easily, for example by using bodies with polygonal cross-sections with different closed loop elements subjected to different polygons (e.g. with 5 and 7 corners). It is also possible to use a multitude of axles, where each axle makes only a limited number of closed loop elements vibrate. Thus they can be vibrated independently.

Figure 3A:
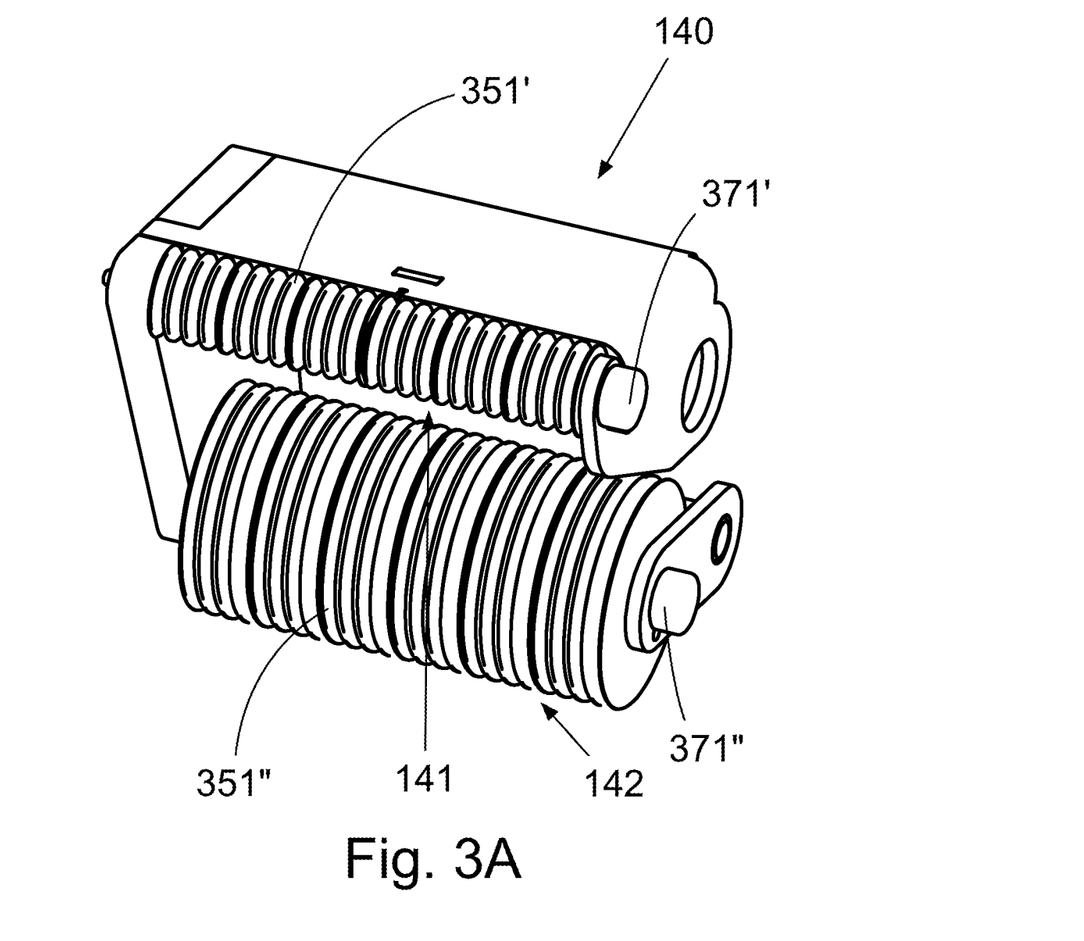
FIG. 3A shows a perspective view of a roll unit, FIG. 3B a side view of said roll unit and FIG. 3C a cross-sectional view through the roll unit along line A-A.
Figure 3B:
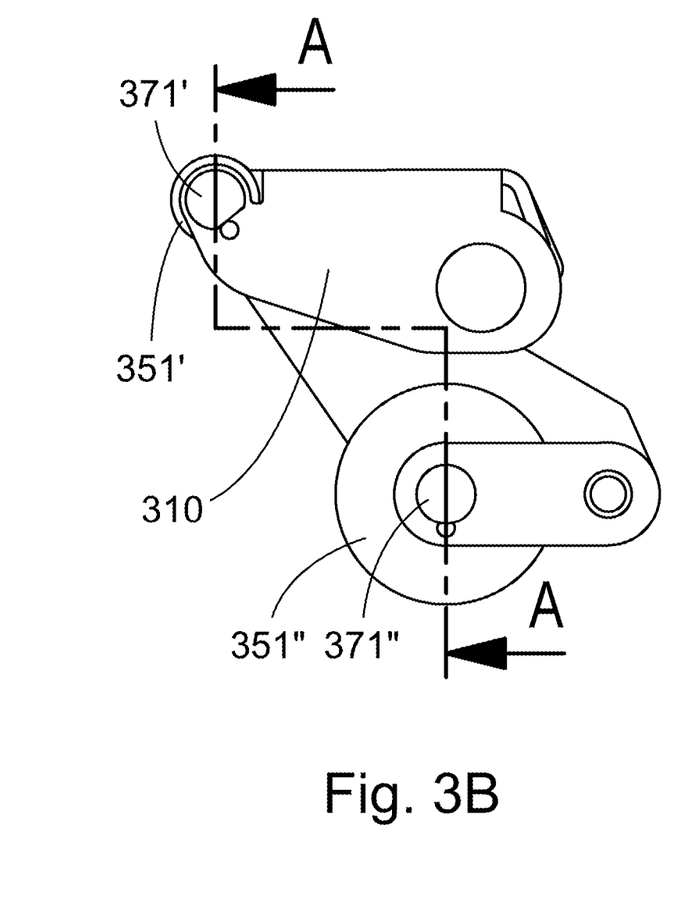

FIG. 3A shows a perspective view of a roll unit (here the second roll unit 140) of the alignment station 100 of FIG. 1. FIG. 3B shows a side view of said roll unit and FIG. 3C a cross-sectional view through the roll unit along line A-A.

The roll unit shown in FIG. 3A comprises a frame 310 to which the second nose roll assembly 141 and the second guide roll assembly 142 are attached. The second nose roll assembly 141 comprises grooves 331' for receiving the closed loop elements 121 (cords), and the second guide roll assembly 142 comprise corresponding grooves 331" for said closed loop elements 121.

Figure 3C:
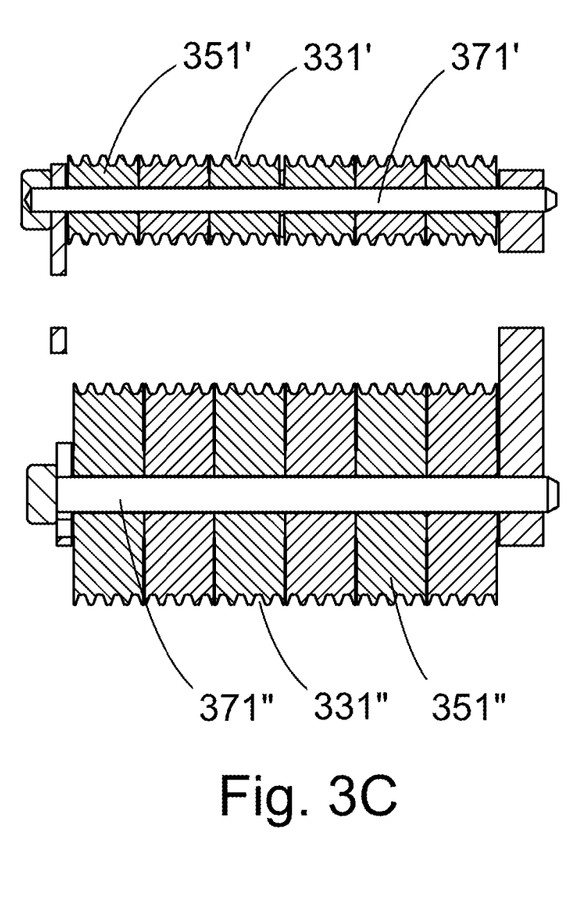

In the embodiment discussed here with reference to FIGS. 1 to 3, there are six sets of closed loop elements 121. To allow the closed loop elements 121 of a set to run with the same speed and to allow the sets of closed loop elements 121 to run at different speeds, the second nose roll assembly 141 comprises six nose rolls 351', one for each set of closed loop elements 121, each nose roll 351' with four grooves 331' for the four strings of a set of closed loop elements 121. The nose rolls 351' are not driven, and are freely rotatable about an axle body 371'. Similarly and for the same reason, the second guide roll assembly 142 comprises six rolls 351" with four grooves 331". The rolls 351" are not driven, and are freely rotatable about an axle body 371".

The invention claimed is:

1. A method of operating an alignment station for slices, said slices being chosen from slices of cheese, meat or fish, said alignment station comprising:
   a conveyor, said conveyor comprising a plurality of closed loop elements, a first roll unit and a second roll unit, wherein
   the first roll unit comprises a first nose roll assembly, said first nose roll assembly, comprising a plurality of first nose rolls,
   defining an upstream end of the conveyor;
   the second roll unit comprises a second nose roll assembly, said second nose roll assembly,
   comprising a plurality of second nose rolls, and
   defining a downstream end of the conveyor;
   the plurality of closed loop elements is configured to run over the first nose roll assembly to the second roll unit assembly;
   said plurality of closed loop elements comprising:
      a first loop section of the plurality of closed loop elements extending from the first nose roll assembly to the second nose roll assembly, wherein said first loop section defines a slice support surface, and
      a second loop section of the plurality of closed loop elements extending from the second roll unit back to the first nose roll assembly;
   a control unit comprising:
      a control module for correcting the orientation of the slice on the slice support surface by varying the relative speed of closed loop elements of the plurality of closed loop elements;
   wherein the method comprises the steps of
   determining the orientation of a slice, and
   correcting the orientation of said slice while on the slice support surface by varying the relative speed of closed loop elements using the control module;
   wherein the slice is subjected to vibration transverse to the slice support surface in the first loop section during said correction of the orientation such that sticking of the slice to the closed loop elements or tension on the slice caused by the different speeds of the closed loop elements are reduced.

2. The method of claim 1, wherein at least two of the closed loop elements are vibrated in the first loop section while said two closed loop elements run at a different speed.

3. The method of claim 2, wherein at least two of the at least two of the closed loop elements are vibrated with at least one of i) a different frequency, ii) a different amplitude or iii) a different phase.

4. The method of claim 3, wherein to vibrate the slice support surface, the alignment station comprises at a side of the first loop section opposite of the slice support surface at least one rotatable axle.

5. The method of claim 4, wherein comprising at least one axle section at an angle to the axis of rotation of the rotatable axle.

6. The method of claim 5, wherein the axis of rotation of the rotatable axle is parallel to a reference plane defined by axes of rotation of the first nose roll assembly and the second nose roll assembly.

7. The method of claim 6, wherein the first nose roll assembly and the second nose roll assembly are passive and the closed loop elements are driven in the second loop section by at least two driven axles under control of the control module.

8. The method of claim 7, wherein the first roll unit and a supply conveyor are laterally movable relative to one another, wherein the method comprises:
- a step of supplying the slice to be oriented using a supply conveyor,
- a step of determining the location of the slice on the supply conveyor, and
- a step of relatively moving the first roll unit and the supply conveyor to allow the slice to be delivered closer to the center line of the support surface of the alignment station at the first roll unit.

9. The method of claim 8, wherein the second roll unit and a downstream conveyor are laterally movable relative to one another, wherein the method comprises:
- a step of determining the location of the slice subjected to rotation while on the support surface, and
- a step of moving the second roll unit of the alignment station and the downstream further conveyor laterally relative to one another to allow the slice to be delivered at a downstream further conveyor comprising a further support surface closer to the center line of said further support surface of said downstream further conveyor.

10. An alignment station for slices, said slices chosen from slices of cheese, said station comprising:
- a conveyor, said conveyor comprising a plurality of closed loop elements, a first roll unit and a second roll unit, wherein
- the first roll unit comprises a first nose roll assembly, said first nose roll assembly comprising a plurality of first nose rolls, and
- defining an upstream end of the conveyor; and
- the second roll unit comprises a second nose roll assembly, said second nose roll assembly comprising a plurality of second nose rolls, and
- defining a downstream end of the conveyor;
- the plurality of closed loop elements is capable of running over the first nose roll assembly to the second roll unit assembly; said plurality of closed loop elements comprising:
  - a first loop section of the plurality of closed loop elements extending from the first nose roll assembly to the second nose roll assembly, wherein said first loop section defines a slice support surface, and
  - a second loop section of the plurality of closed loop elements extending from the second roll unit back to the first nose roll assembly;
- a control unit comprising
  - a control module for correcting the orientation of the slice on the slice support surface by varying the relative speed of closed loop elements of the plurality of closed loop elements;
  - wherein the first loop section of the alignment station comprises a device for allowing a product on the first loop section to vibrate transverse to the slice support surface in the first loop section during said correction of the orientation such that sticking of the slice to the closed loop elements or tension on the slice caused by the different speeds of the closed loop elements are reduced.

11. The alignment station of claim 10, wherein the device is a rotatable axle that is non-round with respect to its axis of rotation.

12. The alignment station of claim 11, wherein the device comprises at least one freely rotatable roll for contact with the closed loop elements in the first loop section.

* * * * *